US009818452B2

(12) United States Patent
Wang et al.

(10) Patent No.: US 9,818,452 B2
(45) Date of Patent: Nov. 14, 2017

(54) REAR PLUGGABLE HARD DISK DRIVE WITH FLOATING CONNECTING MECHANISM

(71) Applicant: DELL PRODUCTS, LP, Round Rock, TX (US)

(72) Inventors: Hsu-Chu (Neil) Wang, Taipei (TW); Corey D. Hartman, Hutto, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/096,732

(22) Filed: Apr. 12, 2016

(65) Prior Publication Data

US 2017/0294214 A1    Oct. 12, 2017

(51) Int. Cl.
G06F 1/16    (2006.01)
G11B 33/12   (2006.01)
G06F 1/18    (2006.01)

(52) U.S. Cl.
CPC .......... G11B 33/122 (2013.01); G06F 1/182 (2013.01); G06F 1/187 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,224,020 A * | 6/1993 | Golledge | ............. | H05K 7/1429 361/679.33 |
| 5,269,698 A * | 12/1993 | Singer | .................. | G11B 25/043 361/679.33 |
| 5,999,406 A * | 12/1999 | McKain | ............... | G11B 31/006 165/80.3 |
| 6,424,523 B1 * | 7/2002 | Curtis | .................. | G11B 33/128 312/331 |
| 6,650,533 B2 * | 11/2003 | Curtis | .................. | G11B 33/128 312/331 |
| 6,847,521 B2 * | 1/2005 | Beall | ..................... | H05K 7/1454 312/223.2 |
| 6,906,914 B2 * | 6/2005 | Stamos | ................ | H05K 7/1445 361/679.31 |
| 8,611,093 B2 | 12/2013 | Terwilliger et al. | | |
| 2003/0206398 A1 * | 11/2003 | Stamos | ................ | H05K 7/1445 361/679.31 |
| 2004/0130861 A1 * | 7/2004 | Beall | ..................... | H05K 7/1454 361/679.02 |

(Continued)

Primary Examiner — Lisa Lea Edmonds
(74) Attorney, Agent, or Firm — Larson Newman, LLP

(57) ABSTRACT

A hard disk drive carrier assembly includes a back panel, and a connection mechanism in physical communication with the back panel of the hard disk drive carrier assembly along a first surface of the connection mechanism. The connection mechanism includes guide pin extending away from a second surface of the connection mechanism. The guide pin to align the hard disk drive carrier assembly with a mid-plane module of an information handling system when the hard disk drive carrier assembly is inserted into a bay of the information handling system. A screw is in physical communication with the connection module to mount the connection mechanism onto the back panel. The screw includes a post, and is inserted through a hole in the connection mechanism and is connected to the back panel. A first diameter of the post is smaller than a second diameter of the hole.

20 Claims, 9 Drawing Sheets

(56) References Cited

U.S. PATENT DOCUMENTS

| | | | |
|---|---|---|---|
| 2006/0012965 A1* | 1/2006 | Beall | H05K 7/1409 361/726 |
| 2011/0173805 A1* | 7/2011 | Richet | G11B 33/123 29/825 |
| 2013/0313952 A1 | 11/2013 | Wu | |
| 2014/0104777 A1* | 4/2014 | Henderson | H05K 7/1489 361/679.31 |
| 2014/0160661 A1 | 6/2014 | Mangay-ayam, Jr. et al. | |

* cited by examiner

REAR PLUGGABLE HARD DISK DRIVE WITH FLOATING CONNECTING MECHANISM

FIELD OF THE DISCLOSURE

This disclosure generally relates to information handling systems, and more particularly relates to a rear pluggable hard disk drive with a floating connecting mechanism.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

A hard disk drive carrier assembly includes a back panel, and a connection mechanism in physical communication with the back panel of the hard disk drive carrier assembly along a first surface of the connection mechanism. The connection mechanism includes a guide pin extending away from a second surface of the connection mechanism. The guide pin aligns the hard disk drive carrier assembly with a mid-plane module of an information handling system when the hard disk drive carrier assembly is inserted into a bay of the information handling system. A screw is in physical communication with the connection module to mount the connection mechanism onto the back panel. The screw includes a post, and is inserted through a hole in the connection mechanism and is connected to the back panel to allow movement between the connection mechanism and the hard disk drive carrier assembly. A first diameter of the post is smaller than a second diameter of the hole.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
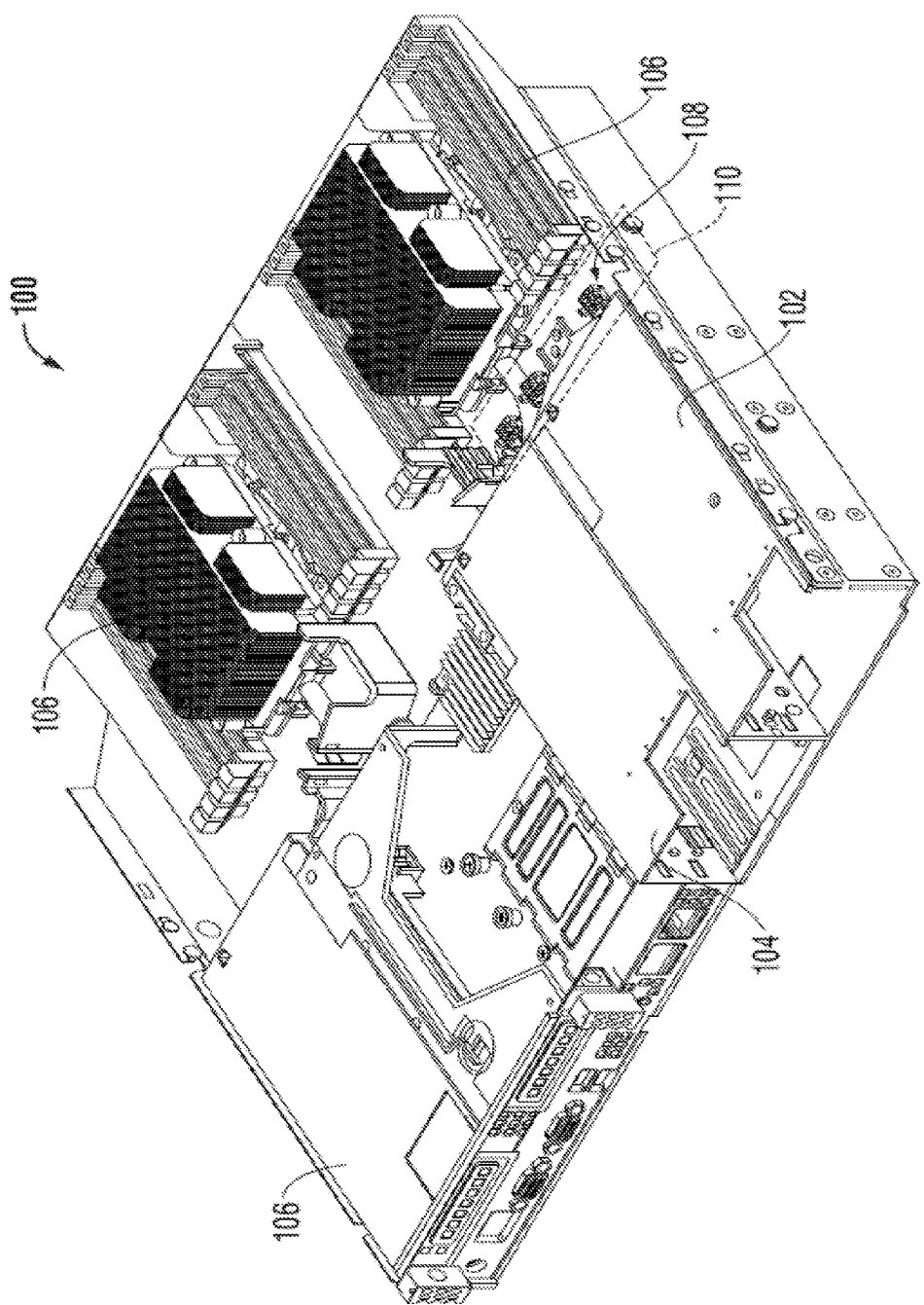
FIG. 1 is a perspective view of an information handling system in accordance with at least one embodiment of the present disclosure.

FIG. 1 illustrates an information handling system 100 in accordance with at least one embodiment of the present disclosure. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system or server blade 100 includes sleeves 102 and 104, which form bays for hard disk drives, power supply units, or the like. The information handling system 100 also includes other components 106, such as batteries, heat sinks, card slots, or the like. The information handling system 100 can be placed within a server rack and can communicate with other information handling systems within the server rack, with information handling systems in other server racks, or the like. The sleeves 102 and 104 are mounted to the chassis of information handling system 100, and baseboard 108 of the information handling system is mounted to the sleeves 104 or 102. This connection shown in region 110 will be discussed in greater detail with respect to FIGS. 6 and 7 below. In an embodiment, a hard disk drive carrier assembly, such as hard disk drive carrier assembly 200 of FIG. 2, can be inserted into sleeve 102 or 104 to connect the module of disk drives to the baseboard 108 of the information handling system 100.

Figure 2:
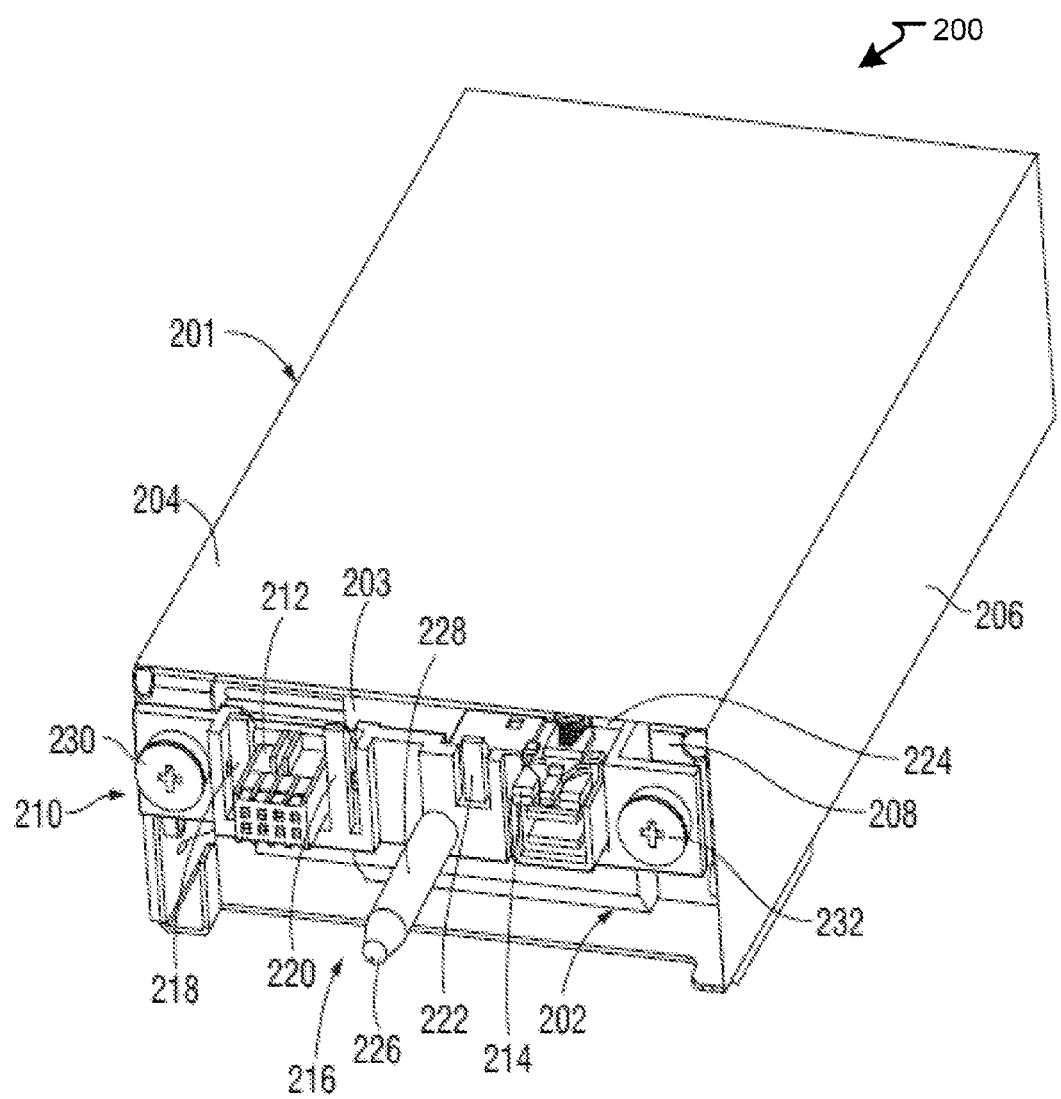
FIGS. 2-5 are different views of a hard disk drive carrier assembly, disk drive cover, and connection mechanism in accordance with at least one embodiment of the present disclosure.

FIGS. 2-5 show a hard disk drive carrier assembly 200 including a disk drive cover 201, disk drives 202 and 203, and a connection mechanism 210 in accordance with at least one embodiment of the present disclosure. In different embodiments, the hard disk drive carrier assembly 200 can include any number of hard disk drives, such as 1, 2, 3, 4, 5, 6, or the like. FIG. 2 illustrates a rear view of the hard disk drive carrier assembly 200. The disk drive cover 201 includes a top surface 204 and a side surface 206. The disk drive 202 includes a back surface 208. The connection mechanism 210 includes a power plug 212, a mini serial attached small computer system interface (SCSI) (SAS) plug 214, a guide pin 216, and latches 218, 220, 222, and 224. In an embodiment, power plug 212 can be held within the connection mechanism 210 via latches 218 and 220, and the mini SAS plug 214 can be held within the connection mechanism via latches 222 and 224. The guide pin 216 includes a first portion 226 and a second portion 228. In an embodiment, the connection mechanism 210 can be connected to the back surface 208 of the disk drive 202 via screws 230 and 232 as will be discussed with respect to FIGS. 4 and 5 below.

Figure 3:
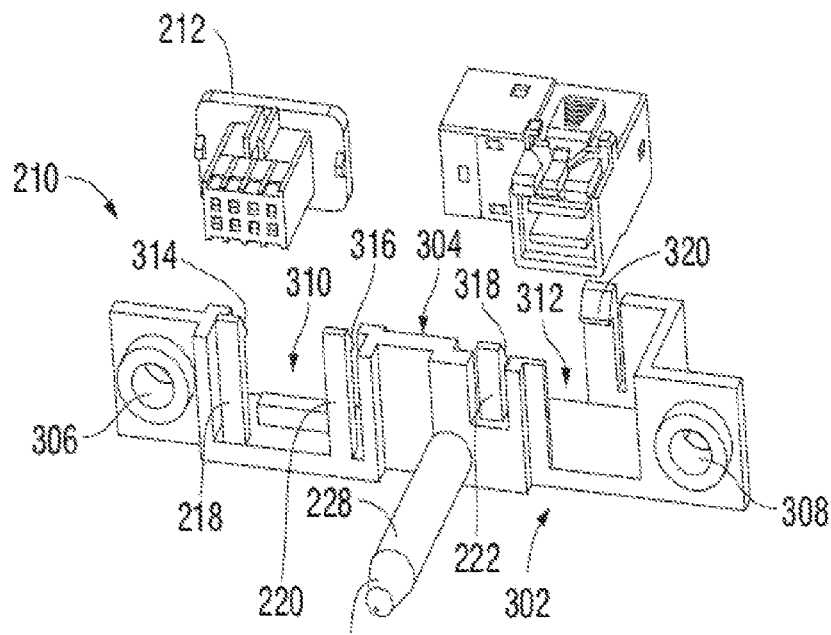

FIG. 3 illustrates an expanded view of the connection mechanism 210, the power plug 212, and the mini SAS plug 214. The connection mechanism 210 includes a front surface 302, a back surface 304, screw holes 306 and 308, slots 310 and 312, guide pin 216, latches 218-224, and a backing 322. Latch 218 includes a hook 314, latch 220 includes a hook 316, latch 222 includes a hook 318, and latch 224 includes hook 320. The power plug 212 can be inserted within slot 310.

The guide pin 216 is connected to the connection mechanism 210 via the second portion 228 at the front surface 302 of the connection mechanism. The guide pin 216 extends outward from the front surface 302 and end at the first portion 226. In an embodiment, the first portion 226 tampers away from the second portion 228 to create a point that can be utilized in aligning the hard disk drive 202 with the baseboard 108 as will be discussed in detail with respect to FIG. 8 below.

In an embodiment, latches 218 and 220 can be located along the front surface 302. As the power plug 212 is inserted into the slot 310 the latches 218 and 200 can be placed in physical communication with a front surface of the power plug, and the backing 322 can be placed in physical communication with a back surface of the power plug. When the power plug 212 is fully inserted within slot 310, the hooks 314 and 316 can snap fit over a top surface of the power plug. Thus, the latches 218 and 220, the backing 322, and the hooks 314 and 316 combine to hold the power plug 212 within the slot 310. The power plug 212 can provide power to the hard disk drives, such as hard disk drives 202 and 203, of the hard disk drive carrier assembly 200 via a power cable.

In an embodiment, latch 222 can be located along the front surface 302 of the connection mechanism 210, and latch 220 can be located along the back surface 304 of the connection mechanism. As the mini SAS plug 214 is inserted into the slot 312 the latch 222 can be placed in physical communication with a front surface of the mini SAS plug, and the latch 224 can be placed in physical communication with a back surface of the mini SAS plug. When the mini SAS plug 214 is fully inserted within slot 312, the hooks 318 and 320 can snap fit over a top surface of the mini SAS plug. Thus, the latches 222 and 224, and the hooks 318 and 320 combine to hold the mini SAS plug 214 within the slot 312. The mini SAS plug 214 can provide a data communication link to the hard disk drives, such as hard disk drives 202 and 203, of the hard disk drive carrier assembly 200 via a signal cable.

Figure 4:
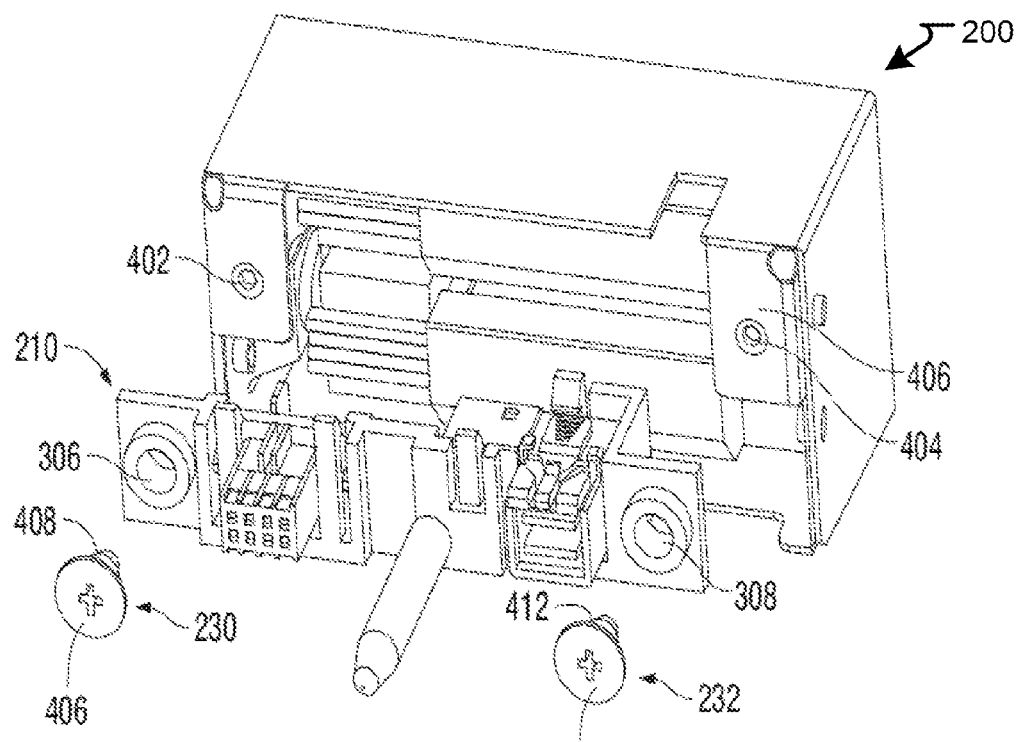

FIG. 4 illustrates a rear view of the hard disk drive carrier assembly 200 and the connection mechanism 210. The hard disk drive carrier assembly 200 includes screw holes 402 and 404 on a back panel 406 of the disk drive cover 201. The screw 230 includes a head 406 and a post 408. The screw 232 includes a head 410 and a post 412. The connection mechanism 210 can be connected to the hard disk drive carrier assembly 200 via the screws 230 and 232. The post 408 of screw 230 can be inserted into the hole 306 can be screwed into hole 402 of the hard disk drive carrier assembly 200, and the screw can be tightened via head 406. Similarly, the post 412 of screw 232 can be inserted into the hole 308 can be screwed into hole 404 of the hard disk drive carrier assembly 200, and the screw can be tightened via head 410.

Figure 5:
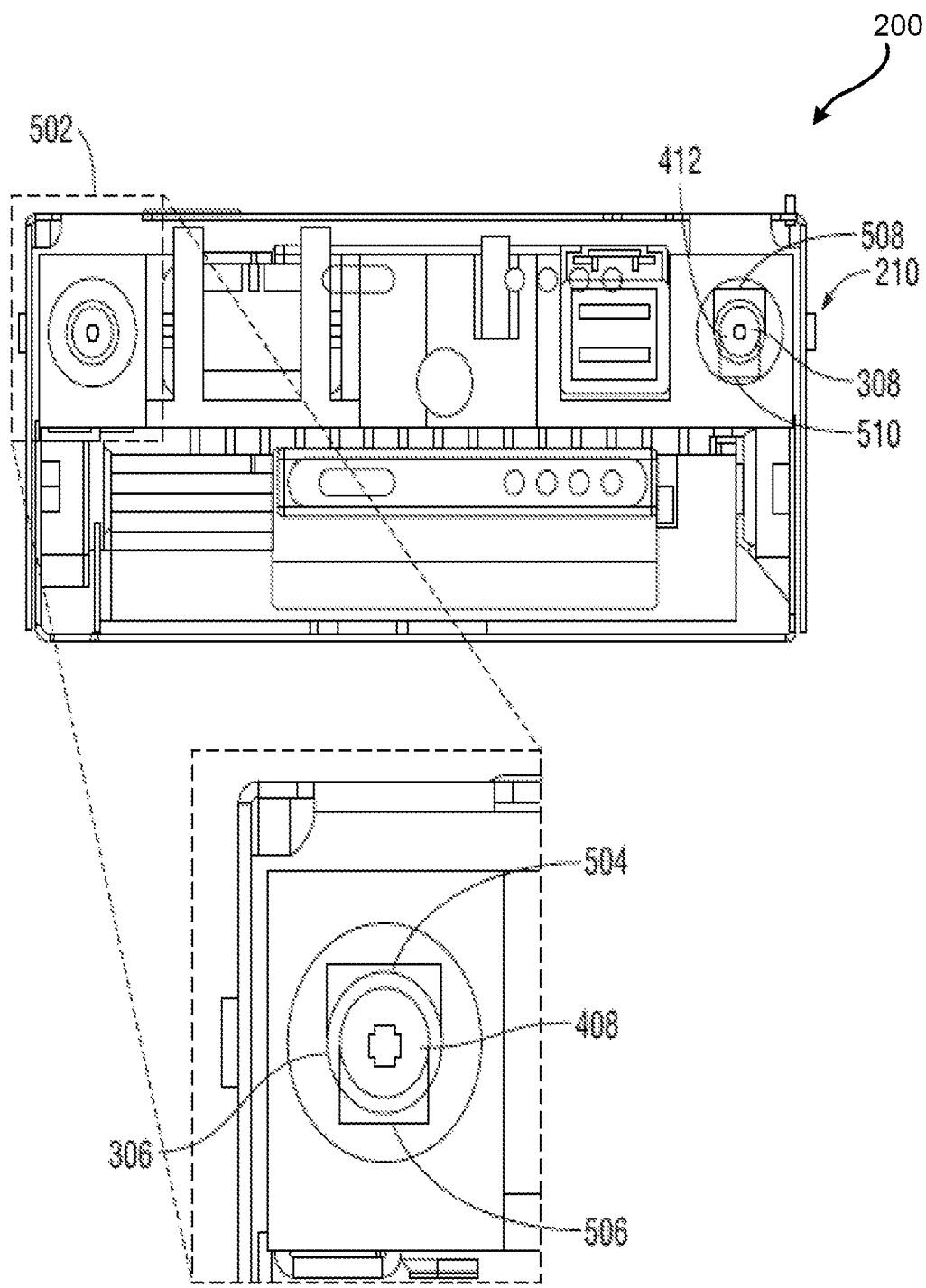

FIG. 5 illustrates an enlarged view of a portion 502 of the hard disk drive carrier assembly 200 and the connection mechanism 210. The enlarged view of portion 502 illustrates the post 408 of screw 230 within the hole 306 of the connection module 210. The hole 306 has a diameter 504, and the post 408 of screw 230 has a diameter 506. In an embodiment, the diameter 504 is larger than the diameter 506, such that the post 408 can move within hole 306. Similarly, the hole 308 has a diameter 508, and the post 412 of screw 232 has a diameter 510. In an embodiment, the diameter 508 is larger than the diameter 510, such that the post 412 can move within hole 308. In an embodiment, the movement of the post 408 of screw 230 within hole 306 and the movement of the post 412 of screw 232 within hole 308 can enable the connection module 210 to 'float' in its connection with the hard disk drive carrier assembly 200. The floating of the connection module 210 can be utilized during the connection of the disk drive 202 with the baseboard 108 of the information handling system 100 as will be discussed in greater detail with respect to FIG. 9 below.

Figure 6:
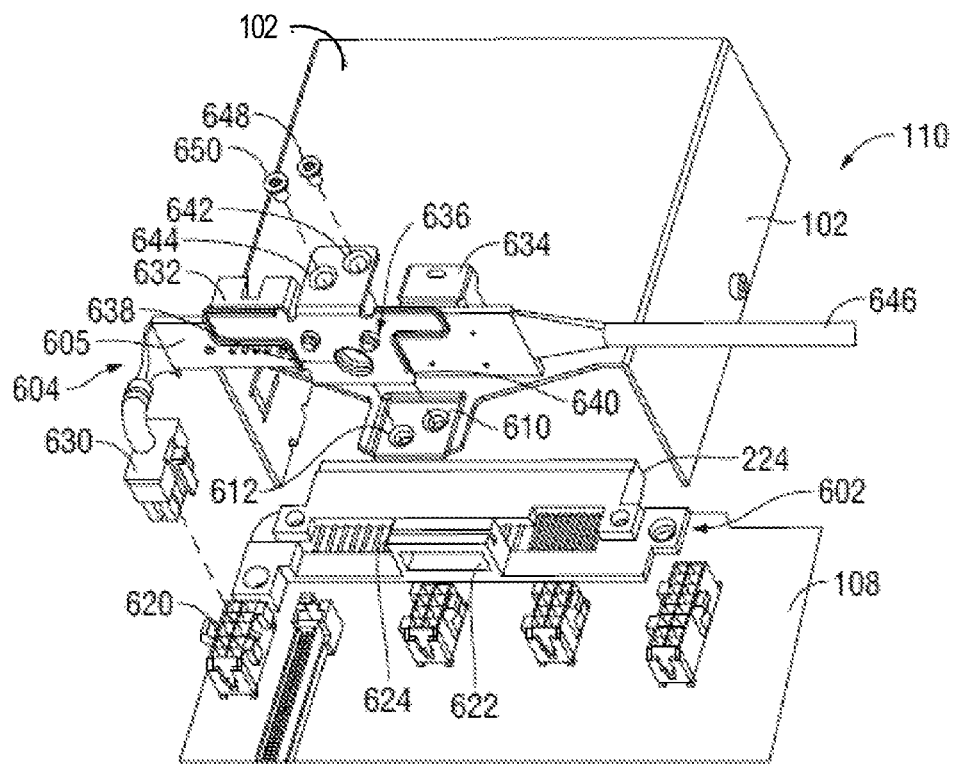
FIG. 6 is an exploded perspective view of a portion of the information including a baseboard, a mid-plane module, and sleeve in accordance with at least one embodiment of the present disclosure.
Figure 7:
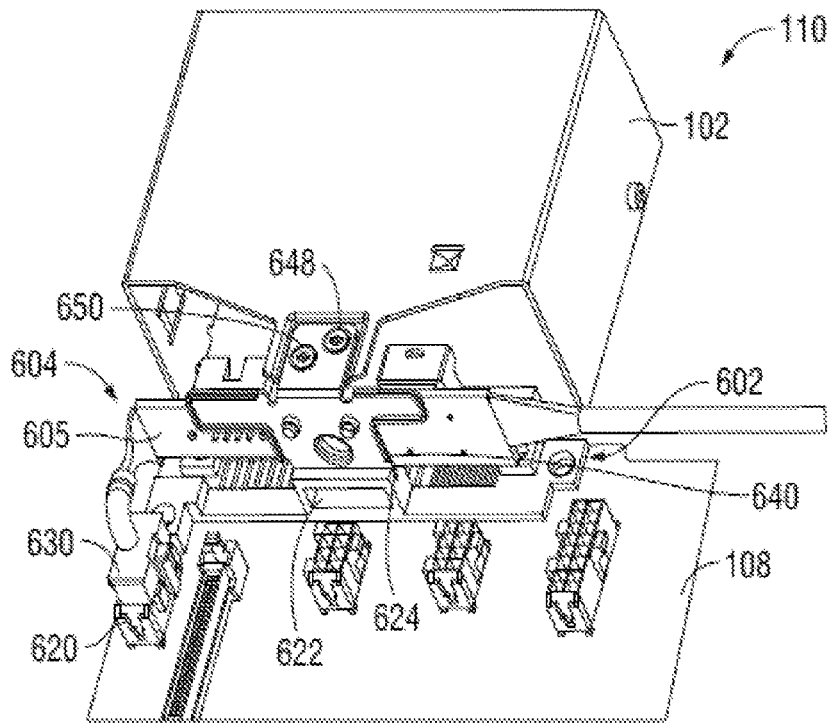
FIG. 7 is a perspective view of the baseboard, the mid-pane module, and the sleeve in accordance with at least one embodiment of the present disclosure.

FIGS. 6 and 7 show a portion 110 of the information handling system 100 including the sleeve 102, the baseboard 108, a power supply unit connector 602, and a mid-plane module 604 in accordance with at least one embodiment of the present disclosure. Referring now to FIG. 6, the sleeve includes holes 610 and 612. The power supply unit connector 602 can be mounted on the baseboard 108, and can include a power connection 620, and a bracket 622 that in turn includes a notch 624. The mid-plane module 604 includes a mid-plane board number 605 a power plug 630, a power connection 632, a mini SAS plug 634, and a mounting bracket 636. The mounting bracket 636 includes a hole 638, a tab 640, holes 642 and 644, and a signal cable 646. In an embodiment, the signal cable 646 can carry the hard disk drive signal, such as SAS or serial AT attachment (SATA) signal, to a storage controller of the information handling system 100. In an embodiment, the storage controller can be in a peripheral component interconnect (PCI) slot or on the baseboard 108.

Referring now to FIG. 7, the mid-plane module 604 can be connected to the sleeve 102 of the information handling system 100 and placed in physical communication with the power supply unit connector 602 of the baseboard 108. In particular, the power plug 630 of the mid-plane module 604 can plug into the power connection 620 of the power supply unit connector 602, which can provide power to the power connection 632 of the mid-plane module 604 when then information handling system 100 is powered on. The tab 640 of the mounting bracket 636 can slip into and be held in place by the notch 624 of the bracket 622 on the power supply unit connector 602. The mid-plane module 604 can then be securely mounted into place by the mounting bracket 636 being attached to the sleeve 102. In particular, screw 648 can be inserted into hole 642 of the mounting bracket 636 and into hole 610 of the sleeve 102. Similarly, screw 650 can be inserted into hole 644 of the mounting bracket 636 and into hole 612 of the sleeve 102. Thus, the mid-plane module 604 can be held securely in place via the screws 648 and 650 connecting the mid-plane module 604 with the sleeve 102, and via the tab 640 being inserted into and held by the notch 640.

Figure 8:
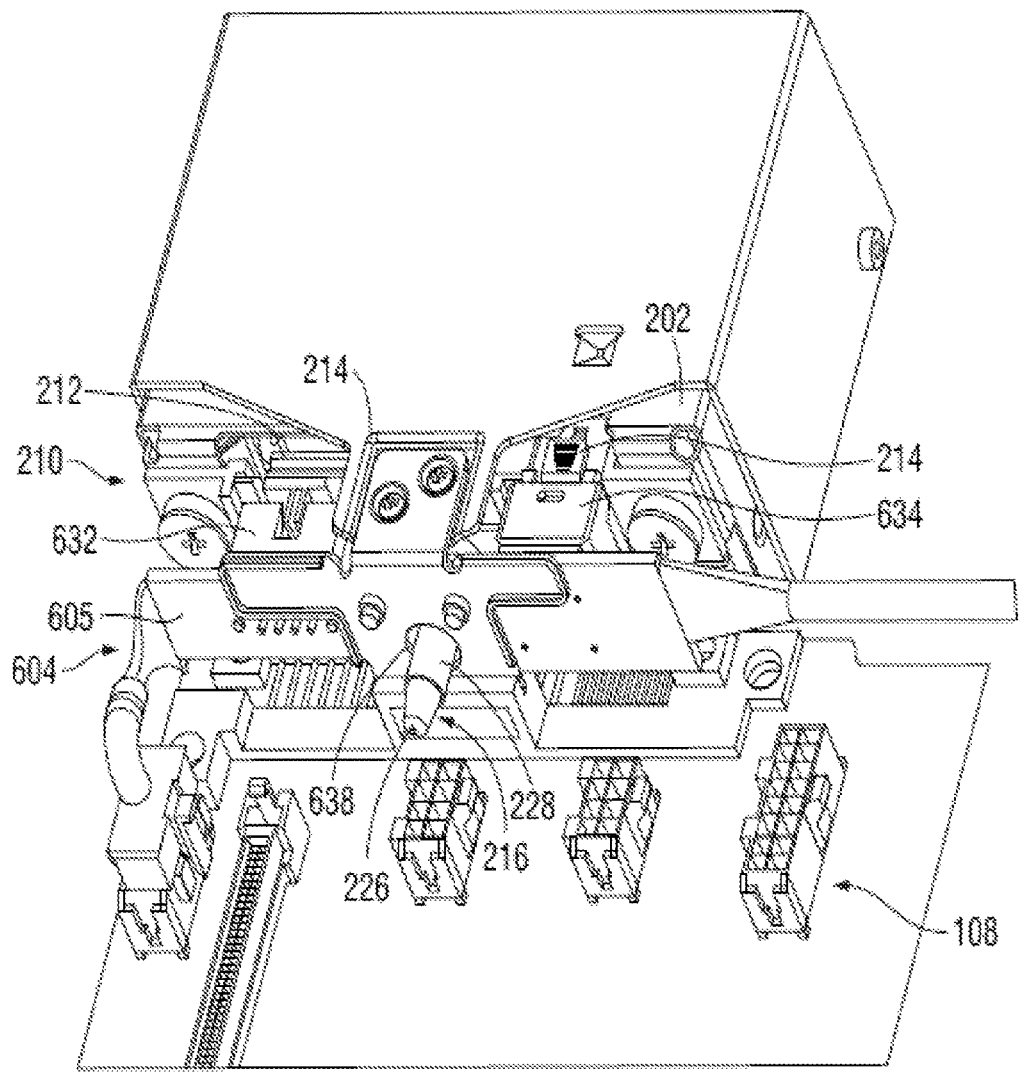
FIG. 8 is a perspective view illustrating the disk drive connected to the mid-plane in accordance with at least one embodiment of the present disclosure.

FIG. 8 shows the disk drive 202 connected to the mid-plane module 604 in accordance with at least one embodiment of the present disclosure. As the hard disk drive 202 is slid within the sleeve 102, the guide pin 216 is aligned with the hole 638 of the mid-plane module 604. In particular, when the tampered end of the first portion 226 is placed in physical communication with the hole 638 and the disk drive 202 is continued to be pushed within the sleeve 102, the disk drive will move one way or another if needed to allow the second portion 228 to be inserted within the hole 638 as shown in FIG. 8.

As described above with respect to FIG. 5, the connection mechanism 210 can float in relation to the disk drive 202, such that the power plug 212 and the mini SAS plug 612 can move while the disk drive does not move within the sleeve 102. Thus, the power plug 212 of the connection mechanism 210 can move, if needed, to create proper alignment with the power connection 632 of the mid-plane module 604, and the mini SAS plug 214 can move, if needed, to create proper alignment with the mini SAS plug 634 of the mid-plane module 604. Thus, the guide pin 216 and the floating of the connection mechanism 210 can enable the proper alignment of the disk drive 202 with the mid-plane module 604. When the power plug 212 is connected to the power connection 632, the disk drives 202 and 203 can receive power from the baseboard 108 via the power plug 630 of the mid-plane module 604 receiving power from the power connection 620 of the power supply unit connector 602. Similarly, when the mini SAS plug 214 is connected to the mini SAS plug 634, the disk drive 202 can communicate with other components within the information handling system 100 or the components of other information handling systems, via the signal cable 646.

Figure 9:
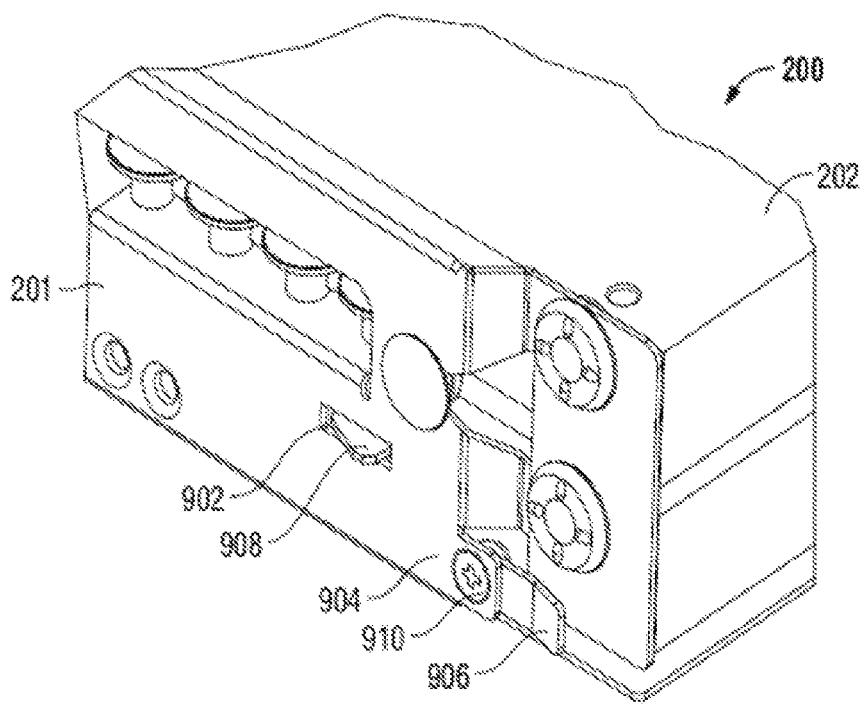
FIGS. 9-11 are perspective views illustrating different stages of the disk drive being connected to the disk drive cover in accordance with at least one embodiment of the present disclosure.
Figure 10:
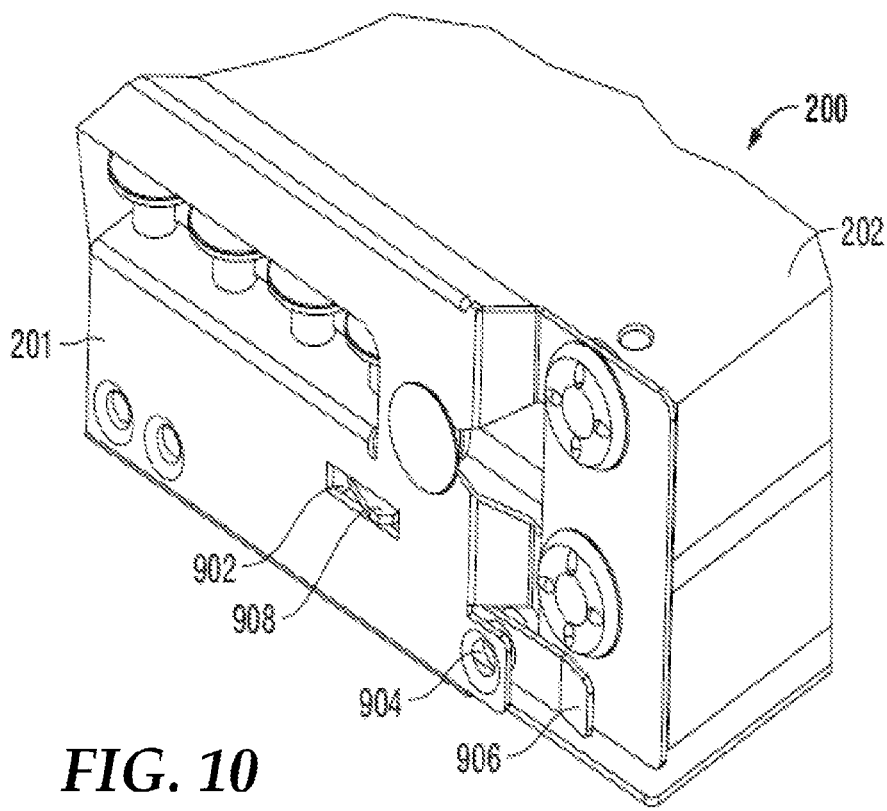
Figure 11:
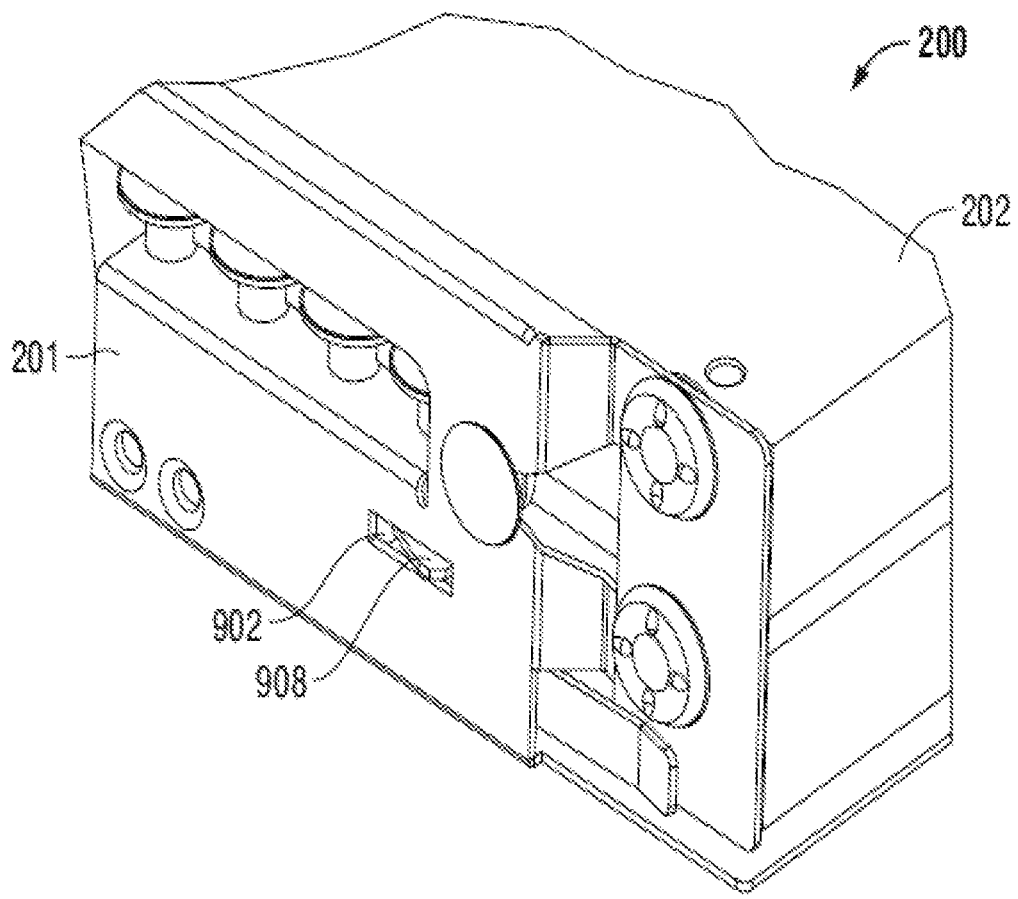

FIGS. 9-11 show different stages of the disk drive 202 being connected to the disk drive cover 201 in accordance with at least one embodiment of the present disclosure. The disk drive cover 201 includes a slot 902 and a screw hole 904. The disk drive 202 includes a latch 906 and a hook 908. Referring to FIG. 9, the disk drive 202 is fully inserted within the disk drive cover 201. In this situation, the hook 908 snap fit into the opening of slot 902 to secure hard disk drive carrier assembly 200 within the sleeve 102. In response to the hook 908 extending through the slot 902, the latch 906 can be placed in physical communication with the disk drive cover 201. The screw 910 can then be inserted into the hole 904 of the disk drive cover 201 to hold the latch 906 in place. In this position, the hard disk drive carrier assembly 200 is securely held within the sleeve 102. Thus, in an embodiment, the latch 906, hook 908, and screw 910 can prevent a user from accidentally removing the hard disk drive carrier assembly 200 from the sleeve 102 during a state of activity or data transfer of the disk drive 202, such as when the disk drive functionally should not be removed. In an embodiment, the screw 910 can be a hand screw, a standard head screw, or the like.

Referring now to FIG. 10, the screw 910 has been removed from the hole 104. In response to the screw 910 being removed, the latch 906 can be pushed away from the edge of the disk drive cover 201. As the latch 906 is pushed away from the disk drive cover 201, the hook 908 can be pulled from the slot 902 until the hook is no longer within the slot as shown in FIG. 11. When the hook 908 is free of the slot 1002, hard disk drive carrier assembly 200 can be removed from the sleeve 102.

Figure 12:
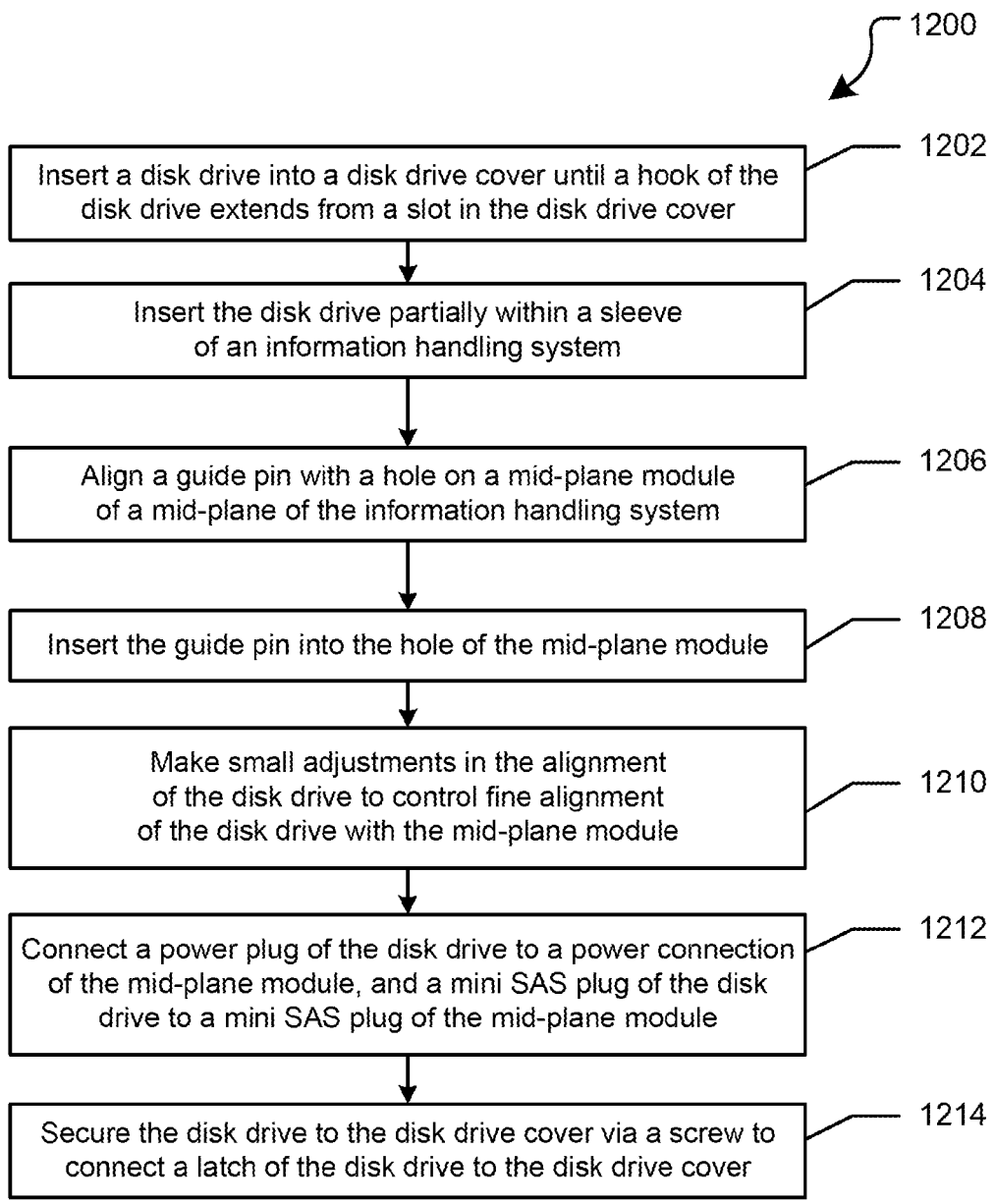
FIG. 12 is a flow diagram of a method for aligning the disk drive with the mid-plane module.

FIG. 12 shows a method 1200 for aligning the disk drive with the mid-plane module. At block 1202, a disk drive is inserted into a disk drive cover until a hook of the disk drive extends from a slot in the disk drive cover. In an embodiment, the hook can snap fit into the slot, such that the disk drive can be held within the disk drive cover. At block 1204, the disk drive is partially inserted within a sleeve of an information handling system. At block 1206, a guide pin is aligned with a hole on a mid-plane module of a baseboard of the information handling system. In an embodiment, the guide pin can extend from a connection mechanism mounted on the disk drive cover.

The guide pin is inserted into the hole of the mid-plane module at block 1208. In an embodiment, the guide pin being inserted in the hole can cause a power plug of the disk drive to be roughly aligned with a power connection of the mid-plane module, and a mini SAS plug of the disk drive to be roughly aligned with a mini SAS connection of the mid-plane module. At block 1210, small adjustments in the alignment of the disk drive are made to control fine alignment of the disk drive with the mid-plane module. In an embodiment, the small adjustments are enabled in response to a screw, connecting the connection mechanism to the disk drive cover, having a post with a smaller diameter than the diameter of a hole in the connection mechanism. At block 1212, a power plug of the disk drive is connected to a power connection of the mid-plane module, and a mini SAS plug of the disk drive is connected to a mini SAS plug of the mid-plane module. The disk drive is secured to the disk drive cover via a screw to connect a latch of the disk drive to the disk drive cover at block 1214.

Although only a few exemplary embodiments have been described in detail in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A hard disk drive carrier assembly comprising:
   a back panel; and
   a connection mechanism in physical communication with the back panel along a first surface of the connection mechanism, wherein the connection mechanism includes:
      a guide pin extending away from a second surface of the connection mechanism, the guide pin to align the hard disk drive carrier assembly with a mid-plane module of an information handling system when the hard disk drive carrier assembly is inserted into a bay of the information handling system; and
      a screw to mount the connection mechanism onto the back panel with movement between the connection mechanism and the hard disk drive carrier assembly, wherein the screw has a post, the screw to be inserted through a hole in the connection mechanism and connected to the back panel, wherein a first diameter of the post is smaller than a second diameter of the hole.

2. The hard disk drive carrier assembly of claim 1 wherein a difference between the diameter of the post and the diameter of the hole enables the connection mechanism to float in different directions when the hard disk drive carrier assembly is connected with mid-plane module.

3. The hard disk drive carrier assembly of claim 1 further comprising:
   a power plug held within a slot of the connection mechanism, the power plug to interface with a power connection of the mid-plane module.

4. The hard disk drive carrier assembly of claim 3 wherein the connection mechanism further includes:
   a latch including a hook, wherein the hook snap fits over a top surface of the power plug to securely hold the power plug within the slot.

5. The hard disk drive carrier assembly of claim 1 further comprising:
   a first mini serial attached small computer system interface (SCSI) (SAS) plug held within a slot of the connection mechanism, the first mini SAS plug to interface with a second mini SAS plug of the mid-plane module.

6. The hard disk drive carrier assembly of claim 5 wherein the connection mechanism further includes:
   a latch including a hook, wherein the hook snap fits over a top surface of the mini SAS plug to securely hold the mini SAS plug within the slot.

7. The hard disk drive carrier assembly of claim 1 further comprising:
   a hook to snap fit within a slot of a disk drive cover in response to the hard disk drive carrier assembly being inserted within the disk drive cover; and
   a latch to remove the hook from the slot in response to the latch being pushed away from the disk drive cover.

8. The hard disk drive carrier assembly of claim 7 further comprising:
   a screw to securely connect the latch with the disk drive cover to hold the hard disk drive carrier assembly within the disk drive cover.

9. A hard disk drive carrier assembly comprising:
   a back panel; and
   a connection mechanism in physical communication with a back panel of the hard disk drive carrier assembly along a first surface of the connection mechanism, wherein the connection mechanism includes:
      a power plug held within a first slot of the connection mechanism, the power plug to interface with a power connection of a mid-plane of an information handling system; and
      a guide pin extending away from a second surface of the connection mechanism, the guide pin to align the power plug with the power connection as the hard disk drive carrier assembly is inserted into a bay of the information handling system.

10. The hard disk drive carrier assembly of claim 9 further comprising:
    a screw to mount the connection mechanism onto the back panel, wherein the screw has a post, the screw to be inserted through a hole in the connection mechanism and connected to the back panel, wherein a first diameter of the post is smaller than a second diameter of the hole.

11. The hard disk drive carrier assembly of claim 10 wherein a difference between the diameter of the post and the diameter of the hole enables the connection mechanism to float in different directions when the power plug is connected with the power connection.

12. The hard disk drive carrier assembly of claim 9 wherein the connection mechanism further includes:
    a first latch including a first hook, wherein the first hook snap fits over a top surface of the power plug to securely hold the power plug within the first slot.

13. The hard disk drive carrier assembly of claim 9 further comprising:
    a first mini serial attached small computer system interface (SCSI) (SAS) plug held within a second slot of the connection mechanism, the first mini SAS plug to interface with a second mini SAS plug of the mid-plane of the information handling system.

14. The hard disk drive carrier assembly of claim 13 wherein the connection mechanism further includes:
    a first latch including a first hook, wherein the first hook snap fits over a top surface of the mini SAS plug to securely hold the mini SAS plug within the second slot.

15. The hard disk drive carrier assembly of claim 9 further comprising:
    a hook to snap fit within a slot of a disk drive cover in response to the hard disk drive carrier assembly being inserted within the disk drive cover; and
    a latch to remove the hook from the slot in response to the latch being pushed away from the disk drive cover.

16. A method comprising:
    inserting a disk drive partially within a sleeve of an information handling system;
    aligning a guide pin with a hole on a mid-plane module of a baseboard of the information handling system;
    inserting the guide pin into the hole of the mid-plane module; and
    automatically making small adjustments in the alignment of the disk drive to control fine alignment of the disk drive with the mid-plane module, wherein the small adjustments are enabled by a screw to mount the connection mechanism onto the disk drive, wherein the screw has a post, the screw to be inserted through a hole in the connection mechanism and connected to the disk drive, wherein a first diameter of the post is smaller than a second diameter of the hole.

17. The method of claim 16 further comprising:
    connecting a power plug of the disk drive to a power connection of the mid-plane module in response to making the small adjustments.

18. The method of claim 16 further comprising:
connecting a first mini SAS plug of the disk drive to a second mini SAS plug of the mid-plane module in response to making the small adjustments.

19. The method of claim 16 further comprising:
inserting the disk drive into a disk drive cover; and
securing the disk drive to the disk drive cover via a screw to connect a latch of the disk drive to the disk drive cover.

20. The method of claim 16 wherein the disk drive is inserted into the disk drive cover until a hook of the disk drive extends from a lost in the disk drive cover.

* * * * *